(12) United States Patent

Williams

(10) Patent No.: US 9,145,030 B2
(45) Date of Patent: Sep. 29, 2015

(54) DOUBLE KINGPIN SKATEBOARD TRUCK INCORPORATING A DOUBLE HOLE BUSHING

(71) Applicant: Alfred Williams, Benicia, CA (US)

(72) Inventor: Alfred Williams, Benicia, CA (US)

( * ) Notice: Subject to any disclaimer, the term of this patent is extended or adjusted under 35 U.S.C. 154(b) by 188 days.

(21) Appl. No.: 13/691,777

(22) Filed: Dec. 1, 2012

(65) Prior Publication Data

US 2014/0151972 A1 Jun. 5, 2014

(51) Int. Cl.
| | |
|---|---|
| B60B 35/02 | (2006.01) |
| B60B 35/00 | (2006.01) |
| B60B 35/04 | (2006.01) |
| A63C 17/01 | (2006.01) |
| A63C 17/02 | (2006.01) |
| A63C 17/00 | (2006.01) |

(52) U.S. Cl.
CPC ........... *B60B 35/025* (2013.01); *A63C 17/0093* (2013.01); *B60B 35/006* (2013.01); *B60B 35/04* (2013.01); *A63C 17/00* (2013.01); *A63C 17/01* (2013.01); *A63C 17/012* (2013.01); *A63C 17/015* (2013.01); *A63C 17/02* (2013.01); *B60Y 2200/81* (2013.01)

(58) Field of Classification Search
CPC ...... A63C 17/01; A63C 17/012; A63C 17/00; A63C 17/02; B60B 35/02
See application file for complete search history.

(56) References Cited

U.S. PATENT DOCUMENTS

| | | | | |
|---|---|---|---|---|
| 6,474,666 | B1 * | 11/2002 | Andersen et al. | 280/87.041 |
| 6,547,262 | B1 * | 4/2003 | Yamada et al. | 280/11.28 |
| 7,044,485 | B2 * | 5/2006 | Kent et al. | 280/87.042 |
| 7,150,460 | B2 * | 12/2006 | Williams | 280/87.042 |
| 2005/0051983 | A1 * | 3/2005 | Williams | 280/87.042 |
| 2005/0051984 | A1 * | 3/2005 | Williams | 280/87.042 |
| 2008/0242129 | A1 * | 10/2008 | Younce et al. | 439/100 |
| 2010/0275571 | A1 * | 11/2010 | Kondo et al. | 59/84 |
| 2011/0210526 | A1 * | 9/2011 | Williams, Jr. | 280/11.28 |
| 2011/0316245 | A1 * | 12/2011 | Burke | 280/11.27 |

* cited by examiner

*Primary Examiner* — J. Allen Shriver, II
*Assistant Examiner* — Hilary L Johns
(74) *Attorney, Agent, or Firm* — Michael P. Kochka, Esq.

(57) ABSTRACT

Embodiments of the present disclosure generally relate to a novel 'double kingpin' type skateboard truck having multiple elastomeric bushings, where one or more of such bushings is an elongated bushing having two staggered mounting holes incorporated herein for the purpose of mounting the bushing upon two bolts in the double kingpin truck mechanism. The novel placement and novel form of the said bushing provides both enhanced overall stability to the truck, as well as a wider range of tension adjustability features to the double kingpin truck system. Moreover, increased shock absorption capabilities, 'wheel wobble' resistance and overall truck mechanism balance, permit the 'double kingpin' type truck to be more useable for higher speed skateboard riding purposes.

17 Claims, 8 Drawing Sheets

DOUBLE KINGPIN SKATEBOARD TRUCK INCORPORATING A DOUBLE HOLE BUSHING

BACKGROUND

1. Field of the Invention

Embodiments of the present invention generally relate to double kingpin skateboard truck incorporating a novel resilient bushing mounted onto the threaded end of a truck insert bolt for the purpose of increasing double kingpin truck stability and rider safety. More specifically, embodiments of the present invention relate to a double kingpin skateboard truck for increased safety and stability of riders of a skateboard incorporating the same.

2. Description of the Related Art

A 'double kingpin' longboard skateboard truck, for example, as disclosed by

U.S. Pat. No. 7,150,460 to Williams, which is incorporated by reference herein in its entirety, is distinguished from a single kingpin skateboard truck by the double kingpin truck's particular incorporation of a truck insert, which is attached between the axle and the base plate of a 'single kingpin' type skateboard truck. More particularly, a commonly known 'double kingpin' type truck, as shown in FIG. 3, comprises a skateboard truck insert, seen in FIG. 3a, capable of being positioned between a base plate and an axle of a skateboard truck. The truck insert generally comprises: an intermediary member; a truck insert pivot pin projecting from the intermediary member for positioning in a pivot pin receiving hole in the base plate; a mounting portion at one end of the intermediary member with an oversized through hole; a blind hole at an end of the intermediary member opposite the one end for receiving a pivot pin projecting from the axle; and an axle bolt hole for receiving a 2 to 3 inch in length axle bolt extending from the axle, where the axle bolt hole is spaced from the blind hole and is located in the intermediary member between the oversized through hole in the mounting portion and the blind hole.

The inclusion of the extra 2 to 3 inch truck insert bolt, two bushings, insert pivot pin and other components incorporated in the truck insert component provides the 'double kingpin' type skateboard truck a hyper-turning, and hyper-traction ability, in comparison to a typical 'single kingpin' type skateboard truck. The double kingpin truck geometry is therefore well suited for skateboard carving, pumping, slalom riding and 'sidewalk surfing' purposes. However, the same 'extra' truck components provided by the inclusion of the 'truck insert,' also makes the 'double kingpin' type skateboard truck less speed stable than a single kingpin truck, making it less suitable for high speed skateboard riding purposes.

Thus, there is a need for a double kingpin skateboard truck incorporating a novelly positioned and novelly formed bushing mounted onto the threaded end of a 2 to 3 inch truck insert bolt for the purpose of increasing double kingpin truck stability and rider safety; said novel bushing formed and utilized as a staggered, double hole bushing.

SUMMARY

Embodiments of the present invention generally relate to double kingpin skateboard truck 25 incorporating a novelly formed and novelly positioned double hole bushing 8 mounted onto the threaded end of a truck insert bolt 21 and methods of manufacturing and utilizing the same. More specifically, embodiments of the present invention relate to double kingpin skateboard truck for increased safety and stability of riders of a skateboard incorporating the same.

In one embodiment of the present invention, a skateboard truck insert 17 capable of being positioned between a base plate 15 and an axle 16 of a skateboard truck 25 comprises an intermediary member 14; a truck insert pin 13 projecting from the intermediary member 14 for positioning in a pin receiving hole 19 in the base plate 15; a mounting portion 24 at one end of the intermediary member 14 with an oversized through hole 27, FIG. 5; a blind hole 33 at an end of the intermediary member 14 opposite the one end for receiving an axle pin 9 projecting from the axle 16; an axle bolt hole for mounting an axle bolt 20 extending into the axle 16, wherein the axle bolt hole is spaced from the blind hole 9 and is located in the intermediary member 14 between the oversized through hole 27, FIG. 5, in the mounting portion 24 and the blind hole 33; a first resilient bushing 2, a second resilient bushing 3 and a novel third resilient bushing 8, said three resilient bushings mounted coaxial with the oversized through hole 27, FIG. 5; a truck insert bolt 21 protruding from the baseplate 15, and being positioned through the first resilient bushing 2, the oversized through hole 27, FIG. 5, the second resilient bushing 3, a dual purpose tensioning nut 4, a novel support washer 7, and into the novel third resilient bushing 8; and with the said novel third resilient bushing 8 optionally formed as a staggered FIG. 2, double hole 5 & 6, resilient bushing.

In another embodiment of the present invention, a skateboard comprises a board; a base plate attached to the board; and a skateboard truck, the skateboard truck comprising at least a skateboard truck insert capable of being positioned between the base plate and an axle comprising: an intermediary member; a truck insert pin projecting from the intermediary member for positioning in a pin receiving hole in the base plate; a mounting portion at one end of the intermediary member with an oversized through hole; a blind hole at an end of the intermediary member opposite the one end for receiving an axle pin projecting from the axle; an axle bolt hole for mounting an axle bolt extending into the axle, wherein the axle bolt hole is spaced from the blind hole and is located in the intermediary member between the oversized through hole in the mounting portion and the blind hole; a first resilient bushing, a second resilient bushing and a novel third resilient bushing, said three resilient bushings mounted coaxial with the oversized through hole; a truck insert bolt protruding from the baseplate, and being positioned through the first resilient bushing, the oversized through hole, the second resilient bushing, a dual purpose tensioning nut, a novel support washer, and into the novel third resilient bushing; and with the said novel third resilient bushing optionally formed as a staggered, double hole, resilient bushing.

In yet a further embodiment, a method of controlling stability on a skateboard having a dual kingpin truck comprises: providing a skateboard, the skateboard having: a board; a base plate attached to the board; and a skateboard truck, the skateboard truck comprising at least a skateboard truck insert capable of being positioned between the base plate and an axle comprising: an intermediary member; a truck insert pin projecting from the intermediary member for positioning in a pin receiving hole in the base plate; a mounting portion at one end of the intermediary member with an oversized through hole; a blind hole at an end of the intermediary member opposite the one end for receiving an axle pin projecting from the axle; an axle bolt hole for mounting an axle bolt extending into the axle, wherein the axle bolt hole is spaced from the blind hole and is located in the intermediary member between the oversized through hole in the mounting portion and the blind hole; a first resilient bushing, a second resilient bushing and a novelly formed and novelly positioned third resilient bushing, said three resilient bushings mounted coaxial with the oversized through hole; a truck insert bolt protruding from the baseplate, and being positioned through the first resilient bushing, the oversized through hole, the second resilient bushing, a dual purpose tensioning nut, a novel support washer, and into the novel third resilient bushing; and with the said novel third resilient bushing optionally formed as a staggered, double hole, resilient bushing; wherein said resilient double hole bushing 8 is tension adjusted by frictional contact between the novel resilient bushing 8, the truck axle 16, bushing support washer 7 and the truck insert bolt 21 by rotation of a dual purpose nut 4 on the truck insert bolt 21, and/or, by the rotation of a nut 23, or head, on an axle bolt 20.

BRIEF DESCRIPTION OF THE DRAWINGS

So the manner in which the above recited features of the present disclosure can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figures 1, 1A:
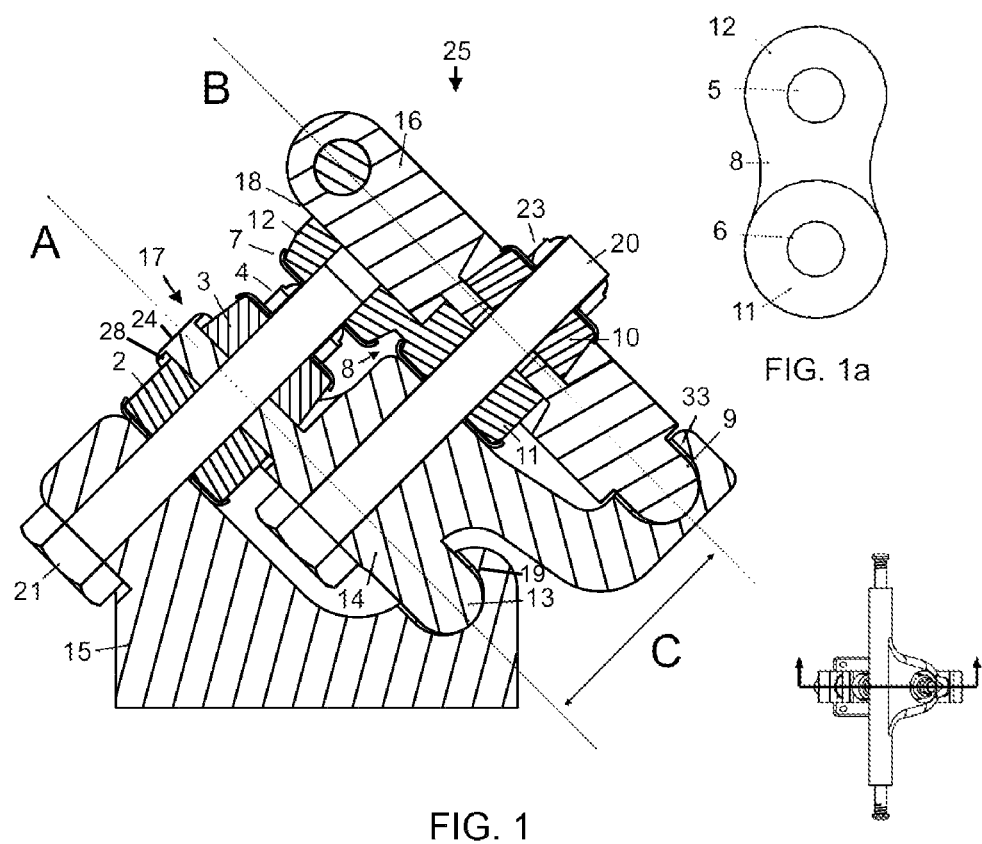
FIG. 1 depicts a cut perspective view of a 'double kingpin' type skateboard truck incorporating a novely formed and novely positioned double hole bushing, a dual function truck insert bolt and a dual function nut, in accordance with one embodiment of the present invention.
FIG. 1*a* depicts a perspective view of a novel, double hole bushing of FIG. 1.
Figure 2:
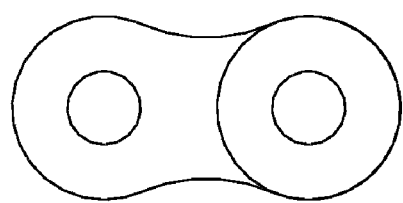
FIG. 2 depicts a top view detail, and a side view perspective, of one type of novel double hole bushing incorporated with two staggered holes in accordance with one embodiment of the present invention.
Figure 2:
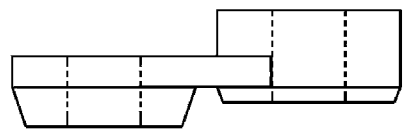
Figures 3, 3A:
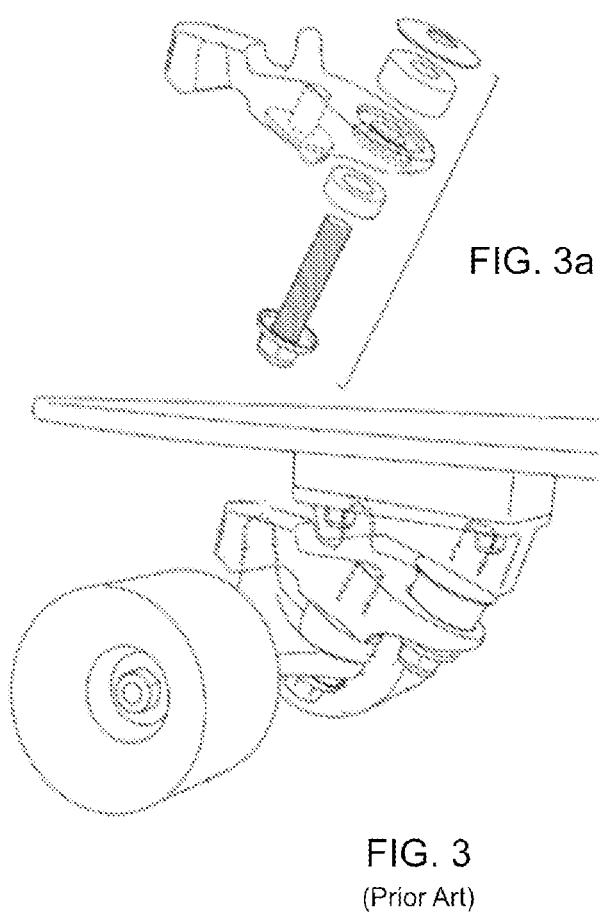
FIG. 3 depicts a side view of a typical double kingpin type skateboard truck.
FIG. 3*a* depicts a skateboard truck insert of the double kingpin type skateboard truck of FIG. 3.
Figure 4:
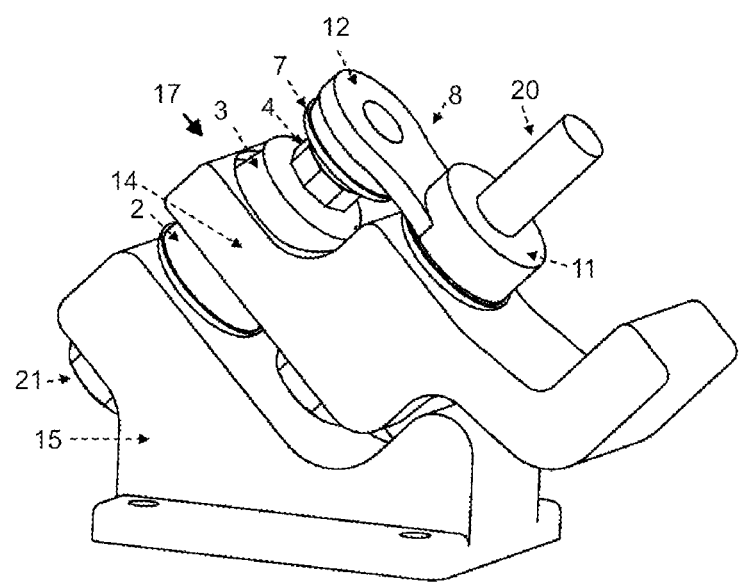
FIG. 4 depicts a side view of a 'reverse kingpin' type baseplate, truck insert intermediary member and novel double hole bushing, without the truck hanger installed, in accordance with one embodiment of the present invention.
Figure 5:
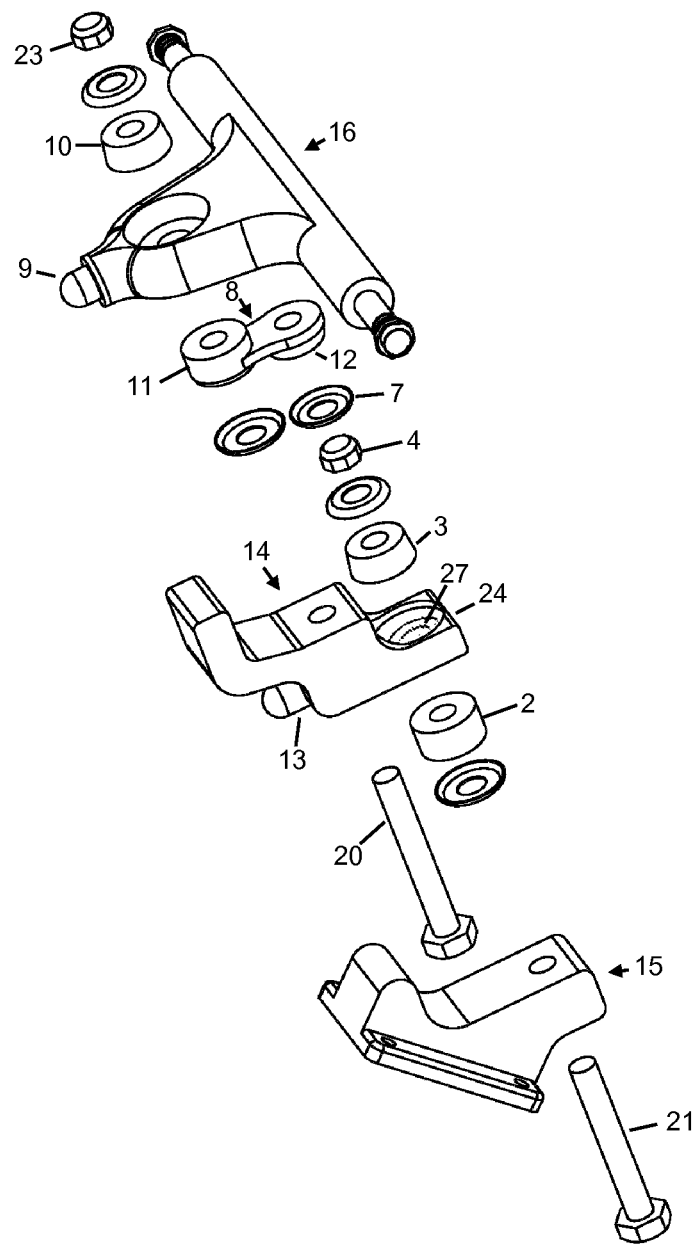
FIG. 5 depicts an exploded view of the novel double kingpin truck with double hole bushing installed, in accordance with one embodiment of the present invention.

The headings used herein are for organizational purposes only and are not meant to be used to limit the scope of the description or the claims. As used throughout this application, the words may and "can" are used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to double kingpin skateboard truck FIG. 1, 25, incorporating a novely positioned and novely formed resilient bushing 8 mounted onto the threaded end of about a 2" to 3" truck insert bolt 21 for the purpose of increasing double kingpin truck stability and rider safety. More specifically, embodiments of the present invention relate to a double kingpin skateboard truck for increased safety and stability of riders of a skateboard incorporating the same.

In many embodiments the novely formed and novely positioned bushing 8 comprises two 'staggered' mounting holes 5 and 6, wherein the mounting holes are designed to be positioned onto the two, 2" to 3" in length bolts 20 and 21 of the double kingpin truck. One of the bolts 21 serves as a 'dual function' truck insert bolt, which is capable of normal truck insert bolt functions such as the tightening of a first resilient bushing 2 and a second resilient bushing 3 on the truck. But the same truck insert bolt 21 also serves to support, with the aid of dual function nut 4 and a novelly positioned bushing support washer 7, a novelly formed and novelly positioned third resilient bushing 8. The inclusion of the third resilient bushing 8, which is novelly positioned coaxially with both the first 2 and second 3 resilient bushings, provides the truck with a greater range of tension adjustability features in comparison to a typical double kingpin truck mechanism. In addition, increased shock absorption capabilities, resistance and overall truck balance, permit the 'double kingpin' type truck of the present invention to be more useable for higher speed skateboard riding purposes.

With the addition of these novel components, additional points of elastomeric support are added to the truck, which help to stabilize it for high speed riding. In many embodiments, one point of additional elastomeric support occurs on a flat 'street side' surface on one end 12 of the novel third resilient bushing 8. The said bushing end 12, of novel bushing 8, is mounted upon a novelly positioned bushing support washer 7, a dual function nut 4, and the dual function truck insert bolt 21 via hole 5 on bushing 8. The said 'street side' of bushing end 12 makes significant, adjustable, elastomeric contact with the flat area 18 on axle 16 wherein the said frictional elastomeric contact serves to resist two varying types of rotation inherent in the novel double kingpin truck mechanism. The first type of rotation resisted is the rotation of axle 16, which pivots about axle axis B, seen in FIG. 1. This axle rotation about axis B is mechanically provided by the elastomeric tension of a 'board side' end 11 of bushing 8, which, in conjunction with a 'street side' normal skateboard bushing 10, serves to suspend axle 16 onto the truck insert intermediary member 14 of truck 25. Axle 16 pivots directly upon bushing end 11 and 'street side' bushing 10 by means of axle pivot pin 9 positioned in the intermediary member blind pivot hole 33.

The second type rotation resisted, seen in axis A, of FIG. 1, is the "offset" rotation provided by the intermediary member 14 by means of the pivot pin 13 positioned into the blind pivot hole 19 on the base plate 15. Because axle 16 does not pivot directly about the first and second resilient bushings 2&3, but rather, said axle 16 is offset from resilient bushings 2 &3 by the distance of dimension "C," seen in FIG. 1, the axle 16 rotates around the 'off set radius' about axis A in the intermediary member 14. The offset radius rotation of axle 16 causes the flat surface 18 of axle 16 to frictionally slide across the abutting flat surface of bushing end 12 of novelly positioned and novelly formed bushing 8 during the riding and turning of the skateboard. When high frictional tension is applied to the flat side 18, of axle 16, by bushing end 12, either by means of the clockwise rotation of nut 23 on axle bolt 20, or the counter clockwise rotation of the dual function nut 4 on the dual function truck insert bolt 21, the high frictional tension greatly reduces the ability of said axle 16 to rotate about the 'off set rotation radius' about axis A. The multitude of bushing, washer, and nut components, all of which are coaxially aligned on truck insert bolt 21, work together to support bolt 21 from breaking under various forms of road shock during riding. Said components also provide some of the additional mechanical support needed to resist the highly leveraged lateral off-set axle rotational forces, said forces which exert stress on the street side threaded end of said 2" to 3" truck insert bolt 21.

Figure 6A:
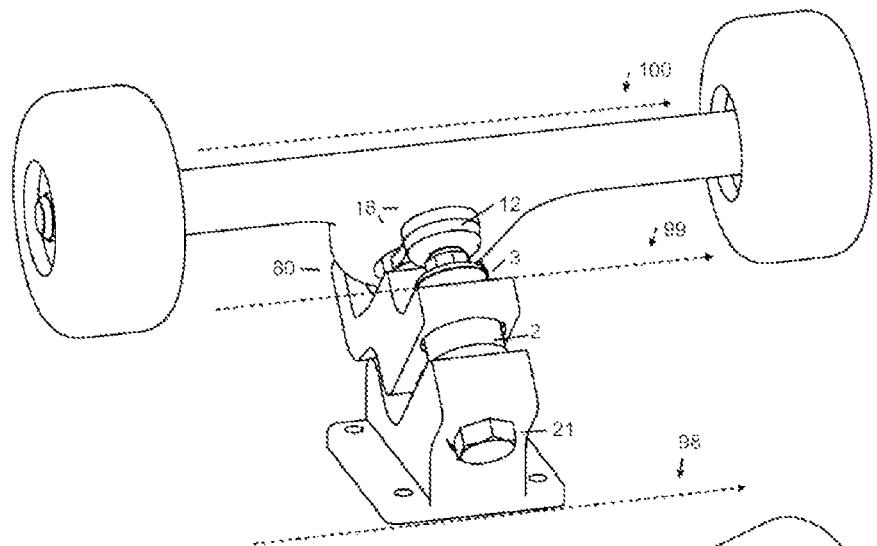
FIGS. 6*a* and 6*b* depict a back perspective view detailing a type of 'truck insert member' rotation and a type of 'off set' rotation of the truck axle, in accordance with one embodiment of the present invention.

In sum, the result of such reduction in the ability of axle rotation, yields that less side to side sliding will occur, back and forth across the surface of the bushing end 12, by the axle area 18, during the riding of the skateboard, as shown in FIG. 6a. This result gives the truck a greater degree of directional stability for higher speed skateboard riding purposes.

Figure 6B:
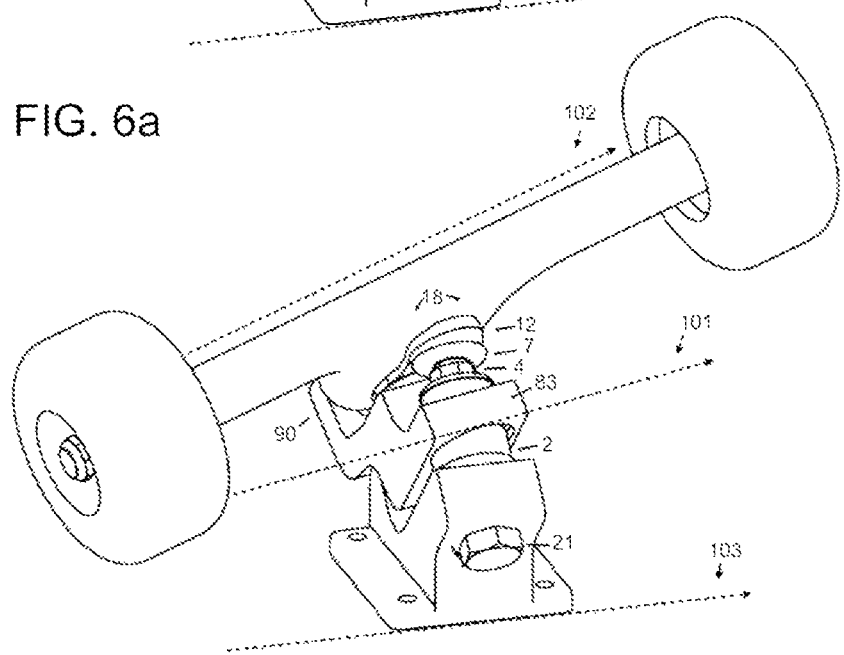

When truck 25, is in a loosely tensioned state, by the counter clockwise rotation of the nut 23 on axle bolt 20, bushing end 12 makes only minor frictional contact with the flat surface 18 on axle 16. As such, axle 16 may fully rotate about the arc of the offset radius of axis A. In addition, with the counter clockwise rotation of nut 23, on axle bolt 20, the loosening of tension of street side bushing 10 and bushing end 11 of novel bushing 8 will allow the maximum degree of rotation of axle 16 about axis B of truck 25, as shown in FIG. 6b. In the highly loosened state, the truck is provided with the highest degree of turning radius, because both 'offset rotation' 101 &90 and regular direct axle rotation about axis B is utilized by the truck 25. This provides tight turning for slalom riding, pumping, sliding and other riding disciplines highly dependent upon sharp radius turning.

With the inclusion of all these extra the components into a double kingpin truck mechanism, an exceptionally wide range of adjustability is afforded to a double kingpin type truck, affording both the tightest radius turns, as well as significant speed stability for higher speed skateboard riding.

Another point of additional elastomeric support provided to the novel truck 25 by the novelly formed and novelly positioned bushing 8, is provided by holes 5 and 6 of bushing 8, wherein the holes 5 and 6 serve to elastically attach the dual function truck insert bolt 21 and axle bolt 20 together. The dual function truck insert bolt 21 is generally located in a rigidly fixed position in the base plate 15, when the base plate is rigidly attached to the deck of a skateboard.

Axle bolt 20, is not rigidly fixed to base plate 15, but rather, is positioned in the truck insert intermediary member 14. The intermediary member 14 is flexibly attached upon the truck base plate 15 by first and second resilient bushings 2 and 3, such that, the axle bolt 20 has the ability to rotate in about a 90 degree angle about Axis A via the rotation of pivot pin 13 positioned into pivot hole 19 in base plate 15. Because the dual purpose truck insert bolt 21 is in a fixed position, relative to the deck of the skateboard upon which it is attached, and axle bolt 20 is not in a fixed position, but rotates laterally relative to the deck of the skateboard, the flexible joining of rotatable bolt 20 to fixed bolt 21 provides a second additional 'point' of elastomeric resistance for the double kingpin truck. This joining also helps keep end 12 of bushing 8 in a stable and centered position on the truck, wherein it will be less likely to be dislodged in the case of severe road shock during the course of skateboard riding.

Figure 7A:
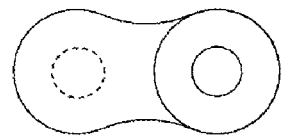
FIG. 7 depicts a side perspective of various possible alternative embodiments that can be incorporated in a double kingpin truck, having a novel double hole bushing, as shown in FIG. 7*a*, in accordance with embodiments of the present invention.
Figure 7A:
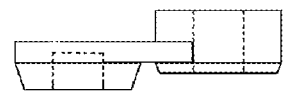
Figure 7:
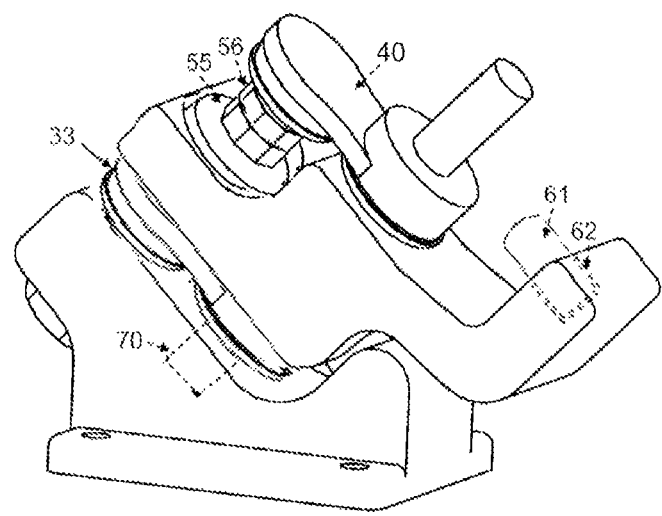

FIG. 7 depicts a side perspective of various possible alternative embodiments that can be incorporated in a double kingpin truck in accordance with embodiments of the present invention. For example, a second hex nut 56, may be added to the 2" to 3" truck insert bolt abutting dual purpose nut 55, FIG. 7, wherein, in this configuration there would no longer be 'dual purpose' tensioning on the same bolt, because the additional nuts 56 and 55 would function as 'lock nuts'. In this mechanical configuration, two separate tensioning capabilities, one for each nut 56 and 55, would be provided to the truck system. Additionally, these nuts might be manufactured in the form of flange nuts, such that metal washers might not be needed to support the respective coaxially aligned bushings. Also, in regards to the novelly formed and novelly positioned bushing 8, it is contemplated that the street side hole in end 12 of bushing 8 might be formed as a blind hole 40, FIG. 7 & FIG. 7a, wherein the threaded end of truck insert bolt 16 cannot pass entirely through. This would serve to exert even more surface area frictional contact to flat surface area 18 of axle 16 when the dual purpose nut 4 is adjusted in a counter clockwise direction.

In addition, the two ends 11 & 12 of novel bushing 8 might be composed of different durometer elastomeric materials, one hard and one soft, which would also provide alternative tensioning capabilities for the truck.

Figure 8:
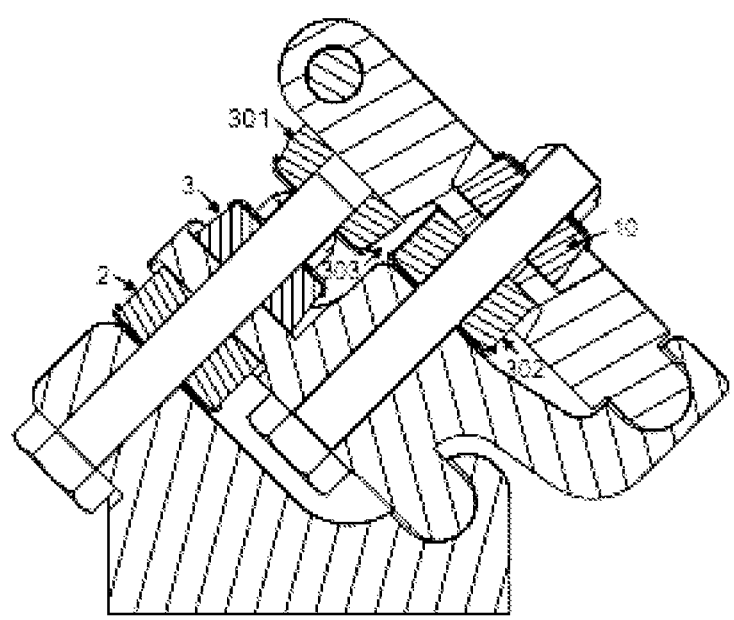
FIG. 8 depicts a cut perspective view of an alternative embodiment type double kingpin skateboard truck incorporating a novelly positioned resilient bushing mounted on the end of a truck insert bolt, and also incorporating a common skateboard bushings positioned on either side of the axle of said truck.

It is also contemplated that the two ends 11 &12 of novel bushing 8 can be divided so as to form two separate bushings such as seen in FIG. 8. Herein, a separation area 303 can be seen between bushings 301 and 302 so as to provide similar, but to a lesser degree, truck stabilizing capabilities as those provided by a 'double hole' bushing. Furthermore, in such an alternative embodiment, some surface area contact is sacrificed, as well as some ability to keep bushing 301 centered and lodged in place in the truck mechanism. An extra nut added to the threaded end of the 2"-3" truck insert bolt 21, or alternatively, a threaded insert installed into novelly placed bushing 301 could serve to help fixate bushing 301 in a stable position on the threaded end of bolt 21. However, with the use of two separate bushings 301 &302 instead of the utilization of a single double hole bushing 8, the said second point of elastomeric support offered by the flexible attachment of truck insert bolt 21 to truck axle bolt 20 would not be provided to the novel double kingpin truck mechanism.

Other conceived embodiments might be the inclusion of pivot 'rods' 61, FIG. 7, in place of 'blind pivot holes' in the novel truck. The pivot rods would be received by corresponding pivot rod receiving holes in the intermediary member 14 and in the axle 16. Another embodiment could be the addition of a second double hole bushing into the novel truck mechanism, see 33, FIG. 7. A short support stud bolt 70, FIG. 7, embedded into the baseplate, in a generally centered location between the kingpin bolt 20 and the pivot hole on base plate 15, would effect to keep the board side end of the additional double hole bushing centered on the double kingpin truck mechanism.

What is claimed is:

1. A skateboard truck insert adapted to be positioned between a base plate and an axle of a skateboard truck, the skateboard truck comprising:
an intermediary member;
a truck insert pin projecting from the intermediary member for positioning in a pin receiving hole in the base plate;
a mounting portion at one end of the intermediary member with an oversized through hole;
a blind hole at an end of the intermediary member opposite the one end for receiving an axle pin projecting from the axle;
an axle bolt hole for positioning an axle bolt extending into the axle, wherein the axle bolt hole is spaced from the blind hole and is located in the intermediary member between the oversized through hole in the mounting portion and the blind hole;
a first resilient bushing, a second resilient bushing and a third resilient bushing, all three said resilient bushings positioned coaxial with the oversized through hole;
a truck insert bolt protruding from the baseplate, and positioned through the first resilient bushing, the oversized through hole, the second resilient bushing, and into the third resilient bushing;
the threaded end of said truck insert bolt firmly supporting said third resilient bushing;
a first recess and a second recess on either side of the mounting portion coaxial with the oversized through hole;
wherein the first resilient bushing and the second resilient bushing are respectively positioned in the first recess and the second recess;
a first washer and a second washer positioned against respective outer ends of the first resilient bushing and the second resilient bushing; and
a third washer positioned against the third resilient bushing, wherein said first, second and third resilient bushings are aligned co-axially with each other;
the truck insert bolt protruding from the baseplate and positioned through the first washer, the first resilient bushing, the oversized through hole, the second resilient bushing, the second washer, a dual purpose nut, the third washer and into the third resilient bushing;
wherein a frictional contact between the axle, the third resilient bushing and the truck insert bolt resists rotation of the axle and rotation of the intermediary member.

2. The skateboard truck insert of claim 1, wherein the truck insert pin and truck insert bolt are longitudinally offset from the blind pivot hole and the axle bolt hole.

3. The skateboard insert of claim 1, wherein the truck insert bolt can be positioned in the oversized through hole in the intermediary member, such that, movement and tilting of the bolt within the hole is possible without the sides of the truck insert bolt coming into contact with the sides of the oversized through hole.

4. The skateboard truck insert of claim 1, wherein the axle bolt hole is a through hole, a blind hole, and/or, a threaded hole.

5. The skateboard truck insert of claim 1, wherein the axle bolt and the truck insert bolt are between about 2 inches to about 3 inches in length.

6. The skateboard truck insert of claim 1, wherein the third resilient bushing elastically attaches the axle bolt and truck insert bolt 7. The skateboard truck insert of claim 1, wherein the frictional contact is controlled by either one of rotation of a nut on the axle bolt or rotation of a nut on the truck insert bolt.

8. A skateboard comprising:
a board;
a base plate attached to the board; and
a skateboard truck, the skateboard truck comprising at least a skateboard truck insert adapted to be positioned between the base plate and an axle comprising:
an intermediary member;
a truck insert pin projecting from the intermediary member for positioning in a pin receiving hole in the base plate;
a mounting portion at one end of the intermediary member with an oversized through hole;
a blind hole at an end of the intermediary member opposite the one end for receiving an axle pin projecting from the axle;
an axle bolt hole for positioning an axle bolt extending into the axle, wherein the axle bolt hole is spaced from the blind hole and is located in the intermediary member between the oversized through hole in the mounting portion and the blind hole;
a first resilient bushing, a second resilient bushing and a third resilient bushing, all three resilient bushings positioned coaxial with the oversized through hole;
a truck insert bolt protruding from the baseplate, and positioned through the first resilient bushing, the oversized through hole, the second resilient bushing, and into the third resilient bushing;
the threaded end of said bolt firmly supporting said third resilient bushing;
the third bushing positioned onto the both the axle bolt and the said truck insert bolt;
a first recess and a second recess on either side of the mounting portion coaxial with the oversized through hole;
wherein the first resilient bushing and the second resilient bushing are respectively positioned in the first recess and the second recess;
a first washer and a second washer positioned against respective outer ends of the first resilient bushing and the second resilient bushing;
and a third washer positioned against the third resilient bushing with the first, second and third resilient bushings aligned co-axially with each other;
the truck insert bolt protruding from the baseplate and positioned through the first washer, the first resilient bushing, the oversized through hole, the second resilient bushing, the second washer, a dual purpose nut, the third washer and into the third resilient bushing;
wherein a frictional contact between the axle, the third resilient bushing and the truck insert bolt resists rotation of the axle and rotation of the intermediary member.

9. The skateboard of claim 8, wherein the truck insert pin and truck insert bolt are longitudinally offset from the blind pivot hole and the axle bolt hole.

10. The skateboard of claim 8, wherein the truck insert bolt can be positioned in the oversized through hole in the intermediary member, such that, movement and tilting of the bolt within the hole is possible without the sides of the truck insert bolt coming into contact with the sides of the oversized through hole.

11. The skateboard of claim 8, wherein the axle bolt hole is a through hole, a blind hole, and/or, a threaded hole.

12. The skateboard of claim 8, wherein the axle bolt and the truck insert bolt are between about 2 inches to about 3 inches in length.

13. The skateboard of claim 8, wherein the third resilient bushing elastically attaches the axle bolt and truck insert bolt together.

14. The skateboard of claim 8, wherein a frictional contact between the axle, the third resilient bushing and the truck insert bolt, resists rotation of the axle and the intermediary member.

15. The skateboard truck insert of claim 14, wherein the frictional contact is controlled by either one of rotation of a nut on the truck insert bolt or rotation of a nut on the axle bolt.

16. A skateboard truck insert adapted to be positioned between a base plate and an axle of a skateboard truck comprising:
- an intermediary member;
- a truck insert pin projecting from the intermediary member for positioning in a pin receiving hole in the base plate;
- a mounting portion at one end of the intermediary member with an oversized through hole;
- a blind hole at an end of the intermediary member opposite the one end for receiving an axle pin projecting from the axle;
- an axle bolt hole for positioning an axle bolt extending into the axle, wherein the axle bolt hole is spaced from the blind hole and is located in the intermediary member between the oversized through hole in the mounting portion and the blind hole;
- a first resilient bushing, a second resilient bushing and a third resilient bushing, all three said resilient bushings positioned coaxial with the oversized through hole;
- a truck insert bolt protruding from the baseplate, and positioned through the first resilient bushing, the oversized through hole, the second resilient bushing, and into the third resilient bushing;
- the threaded end of said truck insert bolt firmly supporting said third resilient bushing;
- the third resilient positioned onto the both the axle bolt and the truck insert bolt; and
- wherein a frictional contact between the axle, the third resilient bushing and the truck insert bolt resists rotation of the axle and rotation of the intermediary member.

17. The skateboard truck insert of claim 16, wherein the frictional contact is controlled by either one of rotation of a nut on the axle bolt or rotation of a nut on the truck insert bolt.

* * * * *